(No Model.)
J. W. BENDER & J. C. HINKLE.
PLASTER OF PARIS SPLINT.
No. 323,775. Patented Aug. 4, 1885.
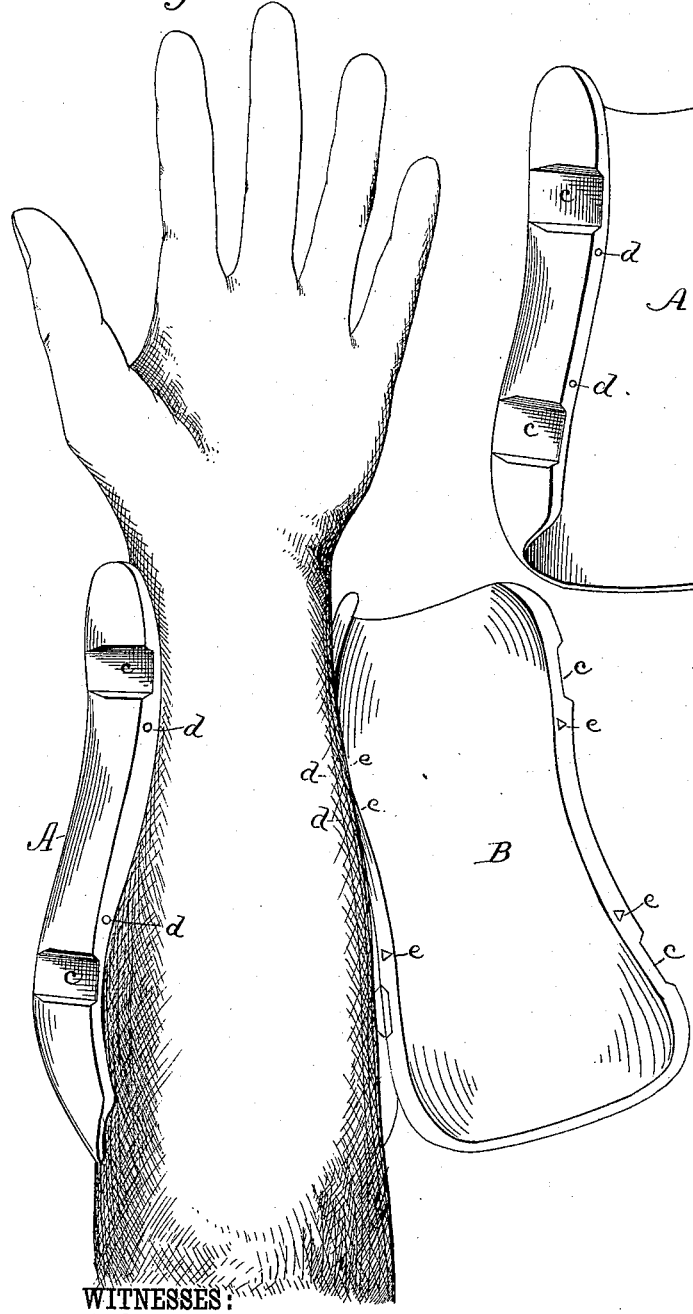
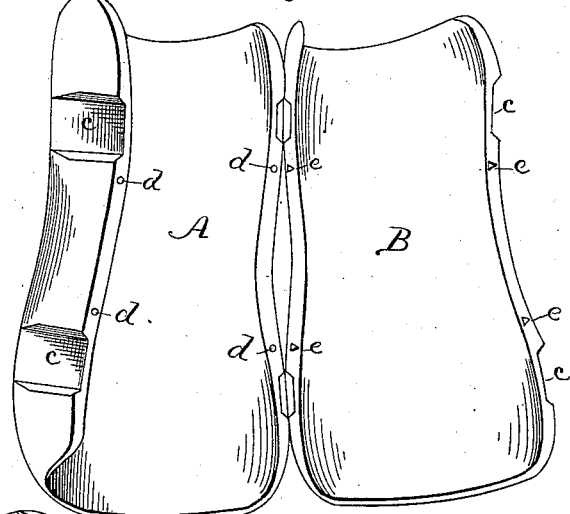
WITNESSES:
Thos. Houghton.
P. B. Turpin.
INVENTOR:
J. W. Bender
J. C. Hinkle
BY Munn & Co.
ATTORNEYS.

UNITED STATES PATENT OFFICE.

JOHN W. BENDER AND JAMES CALDER HINKLE, OF SHIPPENSBURG, PENNSYLVANIA.

PLASTER-OF-PARIS SPLINT.

SPECIFICATION forming part of Letters Patent No. 323,775, dated August 4, 1885.

Application filed March 6, 1885. (No model.)

*To all whom it may concern:*

Be it known that we, JOHN WESLEY BENDER and JAMES CALDER HINKLE, of Shippensburg, in the county of Cumberland and State of Pennsylvania, have invented certain new and useful Improvements in Splints, of which the following is a description.

This invention is an improvement in surgical splints; and it consists in certain novel constructions and combinations of parts, as will be hereinafter more fully described and claimed.

In the drawings, Figure 1 is a perspective view of our splint detached; and Fig. 2 is a perspective view, showing the splint with one section in place and the other raised.

Our invention comprises two segmental sections, A B, made of suitable plastic material, preferably plaster-of-paris. These segmental sections are molded internally to the shape of the side of the limb on which they are to be placed, and are provided on their meeting-edges with interlocking projections $e$ and sockets $d$. In operation, when the splint is on the limb, these interlocking portions prevent any lateral or longitudinal movement of one section on the other, and thereby obviate the pain and difficulty resulting from the slightest movement of the splint. The sections are secured together and on the limb by straps passed around them, and to provide a secure seat for such straps we form the sections with coincident transverse grooves, C, which are formed, preferably, at the joints of the two sections, as shown. By these grooves the strap is held from all possibility of slipping, as will be seen.

In practicing our invention, after the reduction of the fracture the parts should be covered with linen, flannel, or other soft bandaging material that will serve to form a lining for the splint and will protect the parts. The plaster-of-paris should now be mixed with water and applied on a piece of canvas or other suitable substance while in a soft state to form the lower section, A. After such section has hardened its outer side and edges should be shaped up and the grooves $c$ and depression or sockets $d$ formed, as shown. The edges of section A should be oiled to prevent the adhesion of section B in its formation. The section B should now be formed in like manner, the points or projections $e$ being molded to fit the sockets $d$, as will be seen.

The sections may be formed in any desired number of pieces and in any desirable shape. One or both of the sections may be removed at will to enable the surgeon or nurse to treat the parts, and may be reapplied without any inconvenience to the patient.

It will be seen that our bandage is simple of application, may be easily and perfectly adapted to any or all inequalities, and is perfectly secure in its application.

The use of plaster-of-paris splints is common in surgery, and is treated of in surgical works. Heretofore such works have described solid plaster-of-paris cases for partially enveloping the limb, leaving a portion of its anterior surface exposed to view, and anterior splints have been described for application to aforesaid case, the two parts being subsequently bound together. Jackets of plaster-of-paris and cloths have also been described for the treatment of spinal curvature, and suggestions have been made of slitting up the jacket in front and rear, and sometimes of making a hinge behind, so that the jacket may be removed. We do not broadly claim such constructions; but,

Having thus described our invention, what we claim, and desire to secure by Letters Patent, is—

The surgical splint, substantially as herein described, consisting of the segmental sections molded internally to the shape of the limb, and provided on their meeting-edges with interlocking projections and sockets, and having coincident strap-grooves formed in their outer sides, substantially as set forth.

JOHN W. BENDER.
JAMES CALDER HINKLE.

Witnesses:
GEORGE E. EARLEY,
JAMES O. M. BUTTS.